United States Patent
Scher

(12) 
(10) Patent No.: US 6,782,391 B1
(45) Date of Patent: Aug. 24, 2004

(54) INTELLIGENT KNOWLEDGE BASE CONTENT CATEGORIZER (IKBCC)

(75) Inventor: Karen M. Scher, Cranford, NJ (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/410,994

(22) Filed: Oct. 1, 1999

(51) Int. Cl.[7] .............................. G06F 7/00; G06F 17/00
(52) U.S. Cl. ............................ 707/102; 706/45; 706/50
(58) Field of Search ..................... 707/1–7, 100–104, 707/205, 500, 524; 706/50; 709/200–203, 224; 715/500.1, 501.1, 526

(56) References Cited

U.S. PATENT DOCUMENTS

| | | | |
|---|---|---|---|
| 5,021,992 A | * | 6/1991 | Kondo ........................ 706/50 |
| 5,257,185 A | | 10/1993 | Farley et al. |
| 5,649,190 A | | 7/1997 | Sharif-Askary et al. |
| 5,675,785 A | | 10/1997 | Hall et al. |
| 5,684,991 A | | 11/1997 | Malcolm |
| 5,717,925 A | | 2/1998 | Harper et al. |
| 5,758,348 A | | 5/1998 | Neubauer |
| 5,768,578 A | | 6/1998 | Kirk et al. |
| 5,832,499 A | | 11/1998 | Gustman ................... 707/103 |
| 5,835,712 A | | 11/1998 | DuFresne |
| 6,119,101 A | * | 9/2000 | Peckover ..................... 705/26 |
| 6,170,011 B1 | * | 1/2001 | Macleod Beck et al. ... 709/224 |
| 6,292,830 B1 | * | 9/2001 | Taylor et al. ............... 709/224 |
| 6,332,154 B2 | * | 12/2001 | Beck et al. .................. 709/204 |
| 6,519,571 B1 | * | 2/2003 | Guheen et al. ............... 705/14 |

\* cited by examiner

Primary Examiner—Alford Kindred
(74) Attorney, Agent, or Firm—Lowe Hauptman Gilman & Berner, LLP

(57) ABSTRACT

Disclosed is a method for improving the quality of Metadata and information resident on an Internet self-service resource such as a knowledge base (KB). The present invention assists in reducing and/or negating the time customer service agents spent to publish their responses to customer inquiries in a KB. An Intelligent Knowledge Base Content Categorizer (IKBCC) accomplishes both these goals by automatically, intelligently, and consistently evaluating the contents of customer service agent (CSA) responses to customer requests. It proactively determines the value of adding a response to the existing database, and methodically produces Metadata to describe each new KB entry. The IKBCC uses an algorithm that factors in variables (such as KB data, CSA information, administrative parameters, etc.), to evaluate whether a KB entry already exists or should be added. It then determines the nature of the Metadata to describe the added entries. This invention works as an integral part of an overall Internet self-service offering. And its method of indexing agent responses provides end users with a KB that allows them timelier, more relevant query feedback, by categorizing and organizing the data within an available Internet self-service resource.

23 Claims, 4 Drawing Sheets

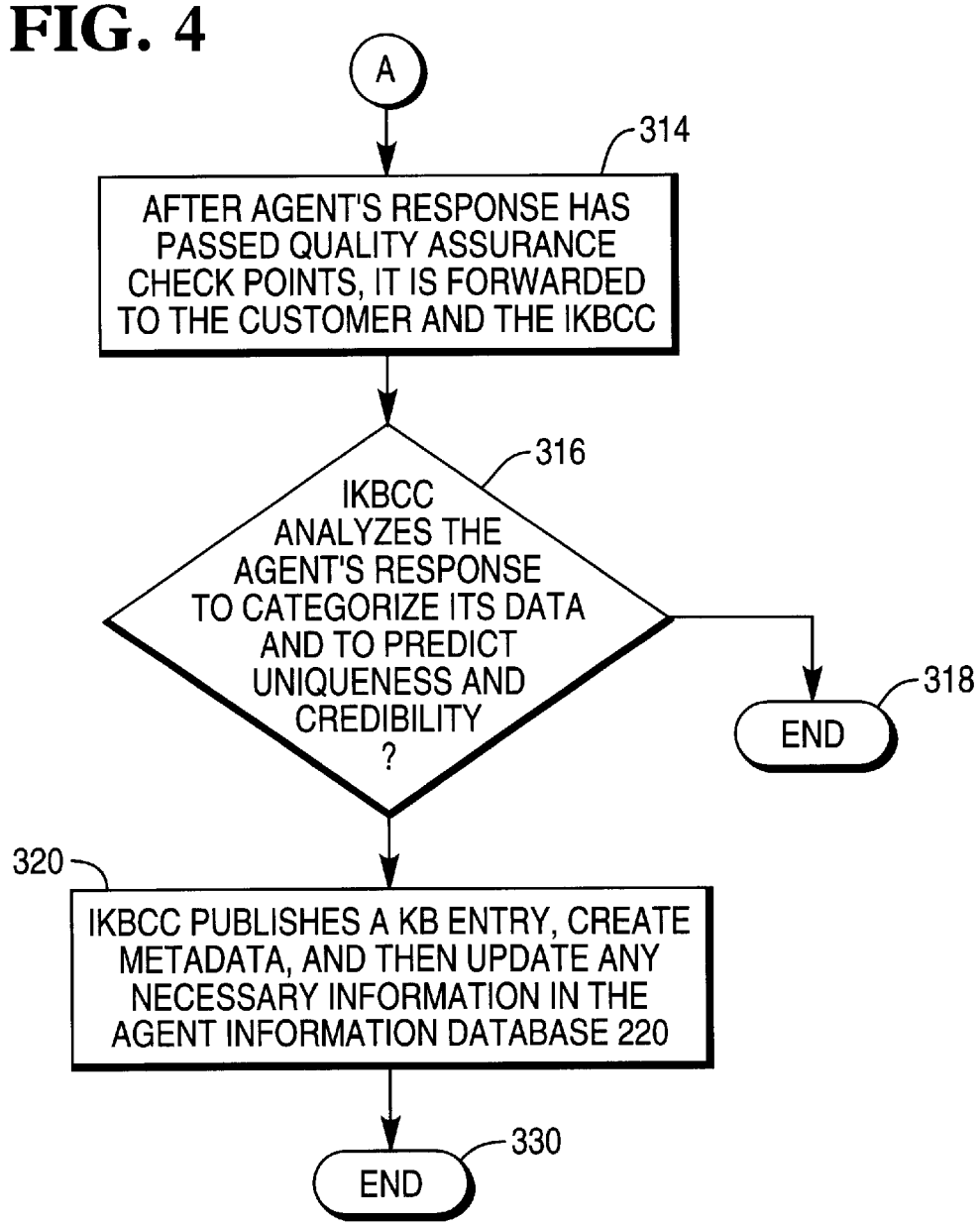

INTELLIGENT KNOWLEDGE BASE CONTENT CATEGORIZER (IKBCC)

RELATED APPLICATION

The present application is related to co-pending application entitled "INTELLIGENT INTERNET WORK DEFLECTOR" (IIWD), Ser. No. 09/410,996, filed on even date herewith, the disclosure of which is hereby incorporated by reference in its entirety into this specification.

FIELD OF THE INVENTION

The present invention relates generally to updating a knowledge base, and more particularly, to a method of automatically creating Metadata and automatically updating the Metadata in a knowledge base.

BACKGROUND OF THE INVENTION

Businesses are taking advantage of the Internet and technology to free up customer service agents (CSAs) by deflecting work from their queues and directing users, such as clients and customers, to other self-service information sources like Internet knowledge bases. The data residing in a knowledge base (KB) is often created and indexed by a customer service agent. Customer service agents spend time to categorize and describe the data (a.k.a. Metadata) so that customers can retrieve the information on-line when querying the KB. Metadata is data about data. Metadata describes how and by whom a particular set of data is collected, and how the data is formatted. Metadata is essential for understanding information stored in data warehouses.

Inconsistencies in data categorization and descriptions, as well as data overlap, is likely to occur with many agents creating Metadata for individual responses. Furthermore, if these situations are present in the KB, it is more difficult to satisfy a user's needs in a timely, productive manner. Responses to KB queries are potentially less concise, and/or relevant. This type of on-line user experience may prompt users to forego use of the KB for their next inquiry and revert to customer service agent based communications through the Internet, or by telephoning a call center staffed with customer service agents, thus defeating the original intention of Internet self-service resources and sites.

An attempt to eliminate this problem is for agents to publish their responses. The responses can be transformed into Metadata. Tools for editing, loading, and transforming Metadata are known. These tools generate Metadata based on user input and load into corresponding databases. For example, Silknet's eService '98 gives agents the ability to intentionally "publish" their responses to a KB so users can query the database for that same data. Disadvantageously, this tool does not prevent the inclusion of inconsistent, overlapping Metadata into the knowledge base.

A need exists for a tool to intelligently, automatically produce Metadata and determine its usefulness in the scheme of the existing KB by extracting information such as previous and potential KB content, administrative parameters, and the like, and using this information before publishing agent responses to user inquiries in the KB. A further need exists for a tool which eliminates the need for agents to intervene in the KB content and categorization process by automatically describing and maintaining the knowledge base. Another need exists for knowledge base that can be automatically updated with Metadata which is consistent, concise and useful.

SUMMARY OF THE INVENTION

It is, therefore, an object of the present invention to provide a method and apparatus using a knowledge base that can be updated with Metadata which is consistent, concise and useful.

Another object of the present invention is to update a knowledge base using customer service agent's responses to customer inquires which are consistent, concise and useful.

It is another object of the present invention to provide a method to extract information such as previous and potential knowledge base content, administrative parameters and the like and advantageously eliminate the need for agents to intervene in the knowledge base content and categorization process, thereby preventing the creation of inconsistent, overlapping, Metadata KB entries.

It is yet another object of the present invention to provide a method to reduce additional customer service agent work (i.e., Metadata creation for every customer inquiry response).

It is yet a further object of the present invention to provide a method that automatically organizes Internet self-service resources such as a KB by providing a methodical, consistent technique for describing and maintaining KB data (i.e., Metadata creation).

It is another object of the present invention to provide a method that increases the credibility of KB data by using factors such as agent skill set, expertise levels, etc., and weighting their importance when creating KB Metadata and entries.

It is yet another object of the present invention to provide a method that reduces the time a customer spends on-line by eliminating the need to browse excessive numbers of KB entries by pre-filtering redundant agent responses, and consistently assigning characteristics and/or attributes to KB data.

It is yet another object of the present invention to provide the opportunity to present more accurate and appropriate responses to an on-line customer inquiry by reducing KB data redundancy, and consistently creating Metadata used in on-line KB queries.

According to the present invention, to promote the use of self-service resources and divert potential agent work (i.e., the creation of Metadata for individual inquiry responses), by using an Intelligent Knowledge Base Content Categorizer (IKBCC) is used to provide descriptive, useful, consistent KB Metadata, minimize KB data overlap, and log KB Metadata/CSA responses. For example, the IKBCC is invoked after an agent's response to a customer request is created and quality checked. The IKBCC evaluates the attributes and/or characteristics of a response based on response content, prior KB entries, KB content index, administrative parameters, and/or other factors. If the IKBCC determines that the response is unique in one or more ways from the current KB entries, then a Metadata entry for the response and the response data itself, are written to the KB without the intervention of a human agent. Advantageously, the IKBCC functions as an interface between a customer service agent and the KB so that the KB can be updated with customer service agents responses to customer inquiries which are consistent, concise and useful.

This invention provides a method for improving the quality of Metadata and information resident on an Internet self-service resource such as a KB. It also assists in reducing and/or negating the time CSAs spend to publish their responses to customer inquiries in a KB. The IKBCC accomplishes both these goals by automatically, intelligently, and consistently evaluating the contents of CSA responses to customer requests. It proactively determines the value of adding a response to the existing database, and methodically produces Metadata to describe each new KB entry. The IKBCC uses an algorithm that factors in variables (such as KB data, CSA information, administrative parameters, etc.), to evaluate whether a KB entry already exists or should be added. It then determines the nature of the Metadata to describe the added entries. This invention works as an integral part of an overall Internet self-service offering. And its method of indexing agent responses provides end users with a KB that allows them timelier, more relevant query feedback, by categorizing and organizing the data within an available Internet self-service resource.

These and other objects of the present invention are achieved by a computer-implemented method of automatically adding data to a database using human agent responses to questions including receiving a question and routing the question to a human agent. Using the human agent's response, it is determined whether to add the response to the database, and if the determining step is positive then updating the database with the response and if the determining step is negative then rejecting the response.

The foregoing and other objects of the invention are achieved by a computer system including a processor and a memory coupled to the processor, the memory having stored therein sequences of instructions, which, when executed by the processor, causes the processor, after receiving a response to a question from a human agent, to perform the steps of using the human agent's response, determining whether to add the response to the database, and if the determining step is positive then updating the database with the response and if the determining step is negative then rejecting the response.

The foregoing and other objects of the invention are achieved by a computer architecture including receiving means for receiving a question and routing the question to a human agent. Using the human agent's response, determining means are provided for determining whether to add the response to the database, and if the determining step is positive then updating the database with the response and if the determining step is negative then rejecting the response.

The foregoing and other objects of the invention are achieved by a data structure including agent responses parsed into Metadata using at least one of keywords, key phrases, response characterizations, and natural language interpretation without overlapping and inconsistent Metadata.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 3 and 4 are flow diagrams of the method according to the present invention.

BEST MODE FOR CARRYING OUT THE INVENTION

A method and apparatus for automatically updating Metadata in a knowledge base using an Intelligent Knowledge Base Content Categorizer are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
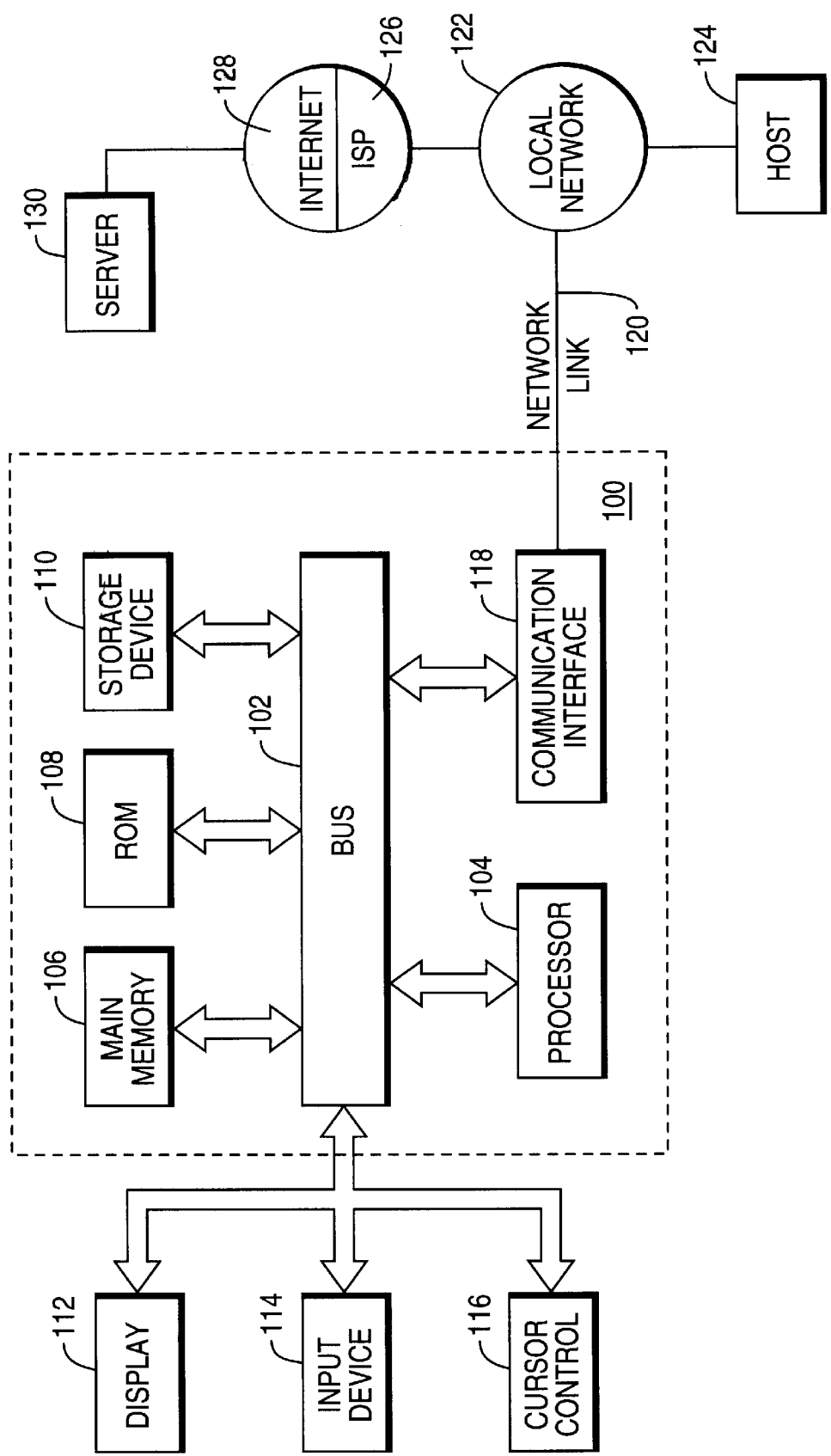
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to automatically update Metadata in a knowledge base using an Intelligent Knowledge Base Content Categorizer. According to one embodiment of the invention, automatic update of the Metadata is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the Metadata. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

The IKBCC produces Metadata intended for KB index integration based on specific pre-defined rules and/or variable parameters set by an administrator (i.e., an algorithm). When a new agent response to a user request is created, the IKBCC determines and specifies the characteristics of the data based on that algorithm.

The algorithm needs to gauge various aspects of the agent, his/her response, and the existing KB in order to appropriately analyze, categorize, and possibly integrate the data. Information concerning current KB data, the on-line customer inquiry, as well as the agent's response could be used as input into the algorithm. By measuring a set of agent response dynamics, the IKBCC can determine if an entry to the KB should be integrated and if so, execute the process to produce Metadata, and enter both the response and its corresponding Metadata into the appropriate entity (i.e., KB, Metadata database).

Figure 2:
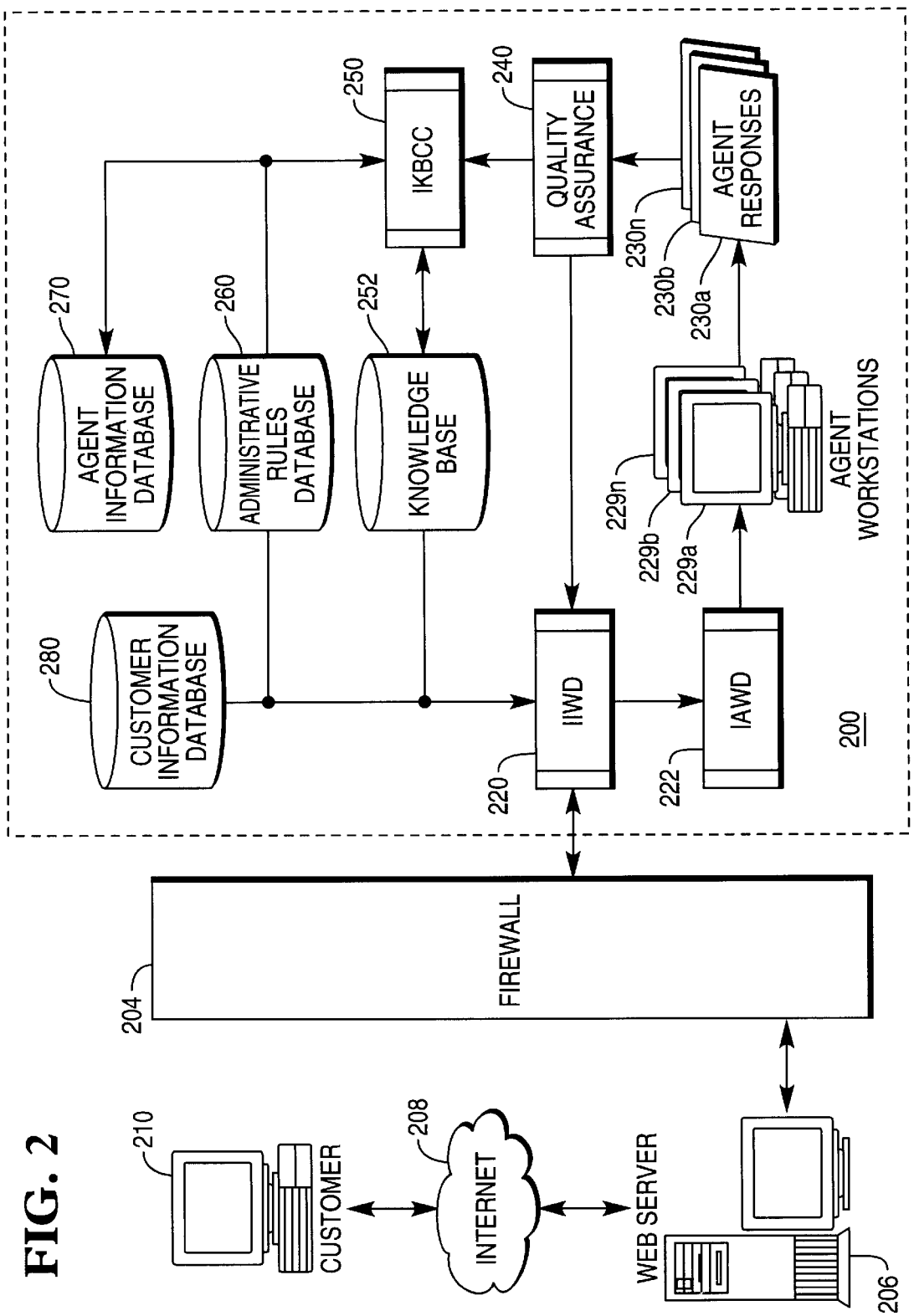
FIG. 2 is a logical architecture and flow diagram of the apparatus and method according to the present invention.

Referring to FIG. 2, a logical architecture for the apparatus 200 of the present invention is depicted. The apparatus 200 is coupled to a firewall 204. The firewall 204 in turn is coupled to a web server 206. The web server 206 is coupled to the Internet 208. A user, such as a customer or client is connected to the Internet 210.

The apparatus 200 includes an Intelligent Internet Work Deflector (IIWD) 220. The IIWD 220 is coupled to an Internet Automatic Work Distributor (IAWD) 222. The IAWD in turn is coupled to a plurality of agent work stations 224a, 224b, 224n. Agents using agent work stations 224a–224n formulate agent responses 230a, 230b, 230n. The agent responses 230a–230n are forwarded through a quality assurance process 240. The quality assurance process is in communication with IIWD 220 and with a (IKBCC) 250. The IKBCC is bi-directionally coupled to a KB 252. An Administrative Rules Database 260 provides rules to both the IIWD 220 and the IKBCC 250. An Agent Information Database 270 is bi-directionally coupled to the IKBCC 250. A Customer Information Database 280 is connected to the IIWD 220 and the Administrative Rules Database 260.

Figure 3:
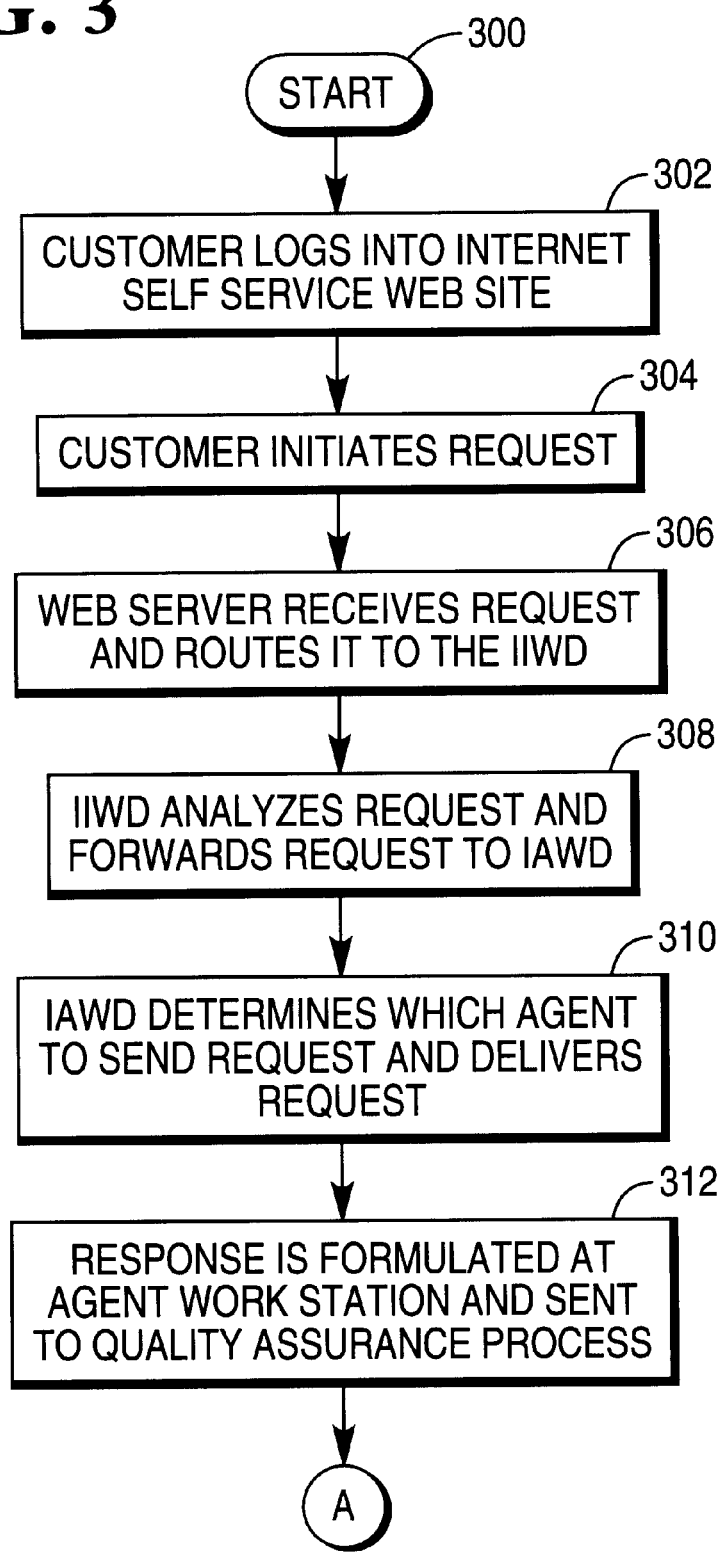

A flow diagram is depicted in FIGS. 3 and 4 which illustrates a scenario of a user's request and then an agent's response. At step 302, a user logs into company XYZ's Internet Self-Service web site at user client computer 210. At step 304, the user initiates a request concerning some XYZ product, service, etc. At step 306, XYZ's Web Server 206 receives the request over the Internet 208 and routes it to the IIWD 220. At step 308, the IIWD 220 analyzes and determines that the request must be routed to an agent for an adequate response, and delivers the request to the IAWD 222. At step 310, the IAWD 222 determines which agent to send the user request to and delivers it to one of the agent work stations 224a–224n. At step 312, the agent work station 224a–224n formulates a response 230a–230n and sends it to the Quality Assurance Process. As depicted in FIG. 4, at step 314, after the agent's response 224a–224n has passed the Quality Assurance check point(s) 240, it is forwarded to the IIWD 220 to be delivered to the user 210 via the Web Server 200 and also to the IKBCC 220. At step 316, the IKBCC 220 analyzes agent's response 224a–224n to categorize its data and to predict its uniqueness and credibility. The analysis is accomplished by executing an algorithm that uses input from the agent's response 224a–224n, the Agent Information Database 270, the Administrative Rules Database 260, and the KB 252. At step 318, if KB 252 is found to have similar entries, or if the credibility of the response is unacceptable, no KB entry will be published, but any appropriate updates to the Agent Information Database 270 will be made. At step 320, if the agent's response 224a–224n is determined to be unique and/or credible, the IKBCC 220 will publish a KB entry, create the appropriate Metadata, and then update any necessary information in the Agent Information Database 220. At step 330, the process is complete.

The following variables represent examples of the types of IKBCC algorithm parameters used in step 316 that might be considered as input to the algorithm for the IKBCC 220 to determine if an agent response 224a–224n should be incorporated into the KB 252 along with associated Metadata.

The first variable is to compare parsed data against KB Metadata. This is performed by parsing the agent response 224a–224n using the following divisional methods. The parsed data is used to match against the KB Metadata using keywords or key phrases and/or response categorizations. A response categorization can refer to categorizing a response based on the type of question answered. For example: "Our *69 services is used to find out who made a call to you if you are unable to answer before the other party hangs up", may be categorized as a "SERVICE" response in the KB because it explains what the *69 service does. The response can be parsed using Natural Language Interpretation. The Natural Language Interpretation can be performed using a natural language engine.

The second variable is to compare the current agent response to previous responses. This data can be obtained by comparing the parsing of the current response to the parsing of previous responses stored in the Agent Information Database 270.

The third variable is to determine the number of KB responses corresponding to current agent response 224a–224n.

The fourth variable is to compare the percentage of exact corresponding and partially corresponding Metadata and/or KB entries. For example, exact corresponding KB entries might be defined in the Administrative Rules Database 260 as having every Keyword, Categorization, and/or Natural Language parse as part of its Metadata. Partially corresponding data entries might be those that have at least one corresponding Metadata.

The fifth variable is the current agent's skill set(s) or areas of expertise and/or status (e.g., senior agent, agent in training, etc.). This data might be contained in the Agent Information Database 270 and is used in evaluating an agent's "credibility factor". For example, an agent who has a high degree of skill in trouble shooting residential lines and who is a senior agent might have his/her response to a residential line problem rated as a 9 out of 10. There might also be an administrative rule in the Administrative Rules Database 260 that provides "if an agent response is not found in the KB 252 and the agent's credibility factor is greater than 7, publish the response." This combination of input into the IKBCC 220 would indicate that the agent response should be published to the KB 252.

The sixth variable is to determine the frequency with which the current agent's responses 224a–224n are published to the KB 252 against specified period of time and status. Again, this data might be found in the Agent Information Database 270 and used in measuring the credibility of an agent's response. If the agent has had 20 published responses in the last six months and is an agent of standard status, then perhaps this information would positively impact the credibility factor of the current response.

The seventh variable is the frequency of recurring customer inquiries to current agent. This data might be housed in the Agent Information Database 270 and assist in evaluating the accuracy and therefore credibility of the agent's responses. For instance, a large business customer of the company's Internet Self-Service web site often submits inquiries which must be answered by an agent. The agent whose response is currently being analyzed is the agent who has supplied this customer with eight adequate responses. This information could once again increase the credibility of the current response during the response evaluation.

The eighth variable is the percentage of times customer inquiries required escalation or reassignment from current agent. Escalation means the inquiry was reassigned to another agent. The Agent Information Database 270 could supply this information to the IKBCC 250 and be a factor in the response's credibility. If, for example, an agent has had five of his/her last ten inquiries escalated, this might in fact, decrease the credibility of the agent's response.

The IKBCC 250 could use many different algorithms to determine whether an agent response should be entered into the KB 252 and to formulate the Metadata needed to describe that response. One possible algorithm is described below. Generally, the IKBCC 250 analyzes, categorizes, and evaluates an agent response, determine its value as an addition to the existing KB 252 and build appropriate Metadata dependent on the aforementioned evaluation. The IKBCC 250 will complete this task using and taking into account various system and user variable such as available KB data, agent response information, administrative parameters, etc.

The following is an algorithm example. A customer 206 submits the following inquiry to an Internet self-service communications company web site 206 via the Internet 208.

"When will One Time 3 Way Calling be available in Rochester, N.Y.?"

A customer service agent responds to the customer inquiry with the following:

"One Time 3 Way Calling will be available in Rochester, N.Y. as of Jul. 7, 1998".

Following processing by the IIWD 220 and the IAWD 222, and after the agent's response has gone through the Quality Assurance Process 240, the IKBCC 250 receives and parses it. In this example, based on rules concerning natural language and keywords/key phrases kept in the Administrative Rules Database 260, the following matches result:

"one time"
"3 way calling"
"Rochester, N.Y."

The matches might result as part of rules included in the Administrative Rules Database 260 because of (1) the frequency of responses to questions concerning "one time" services such as Call Forwarding, or Repeat Call, etc.; (2) "3 Way Calling" might be considered a key phrase because it is a company trademark for a particular service; and (3) "Rochester, N.Y." might be parsed due to recognition of the fact that it represents a city in the company's regional territory.

Based on rules about KB entry categorizations, also kept in the Administrative Rules Database 260, the IKBCC 250 determines whether the response falls into "when", "where", and "service" categories. In this example, the IKBCC 250 parses the date of "Jul. 7, 1998" to determine that this response answers a question requiring a time validation or when something occurs. The IKBCC 250 also parses "Rochester, N.Y." and matches that to a corresponding rule that declares any response containing a recognizable city and state is categorized as a "where" response. And finally, the "3 Way Calling" is noted by the IKBCC 250 as a service offered, and therefore also determines the response belongs in the "service" category. The IKBCC 250 queries current KB Metadata and finds that there is only one KB entry which includes (1) "one time"; (2) "3calling"; and (3) is categorized as a "when", a "where", and a "service" response.

There are ZERO entries that include "Rochester, N.Y.". In this example, it is important that "Rochester, N.Y." was not found in any of the KB data entries. This information will be used in evaluating the uniqueness of the response, i.e., even though there is another data entry which corresponds to all the other parses, there is not an entry which specifically addresses this particular place or "where" part of the question. Dependent upon the rest of the IKBCC 250 analysis, i.e., agent credibility, and the Administrative Rules, this could indicate that the response should be included as a new entry to the KB.

The IKBCC 250 queries the Agent Information Database 270 for any data specifically related to the agent who formulated the current response and returns the following data. In this example, the current agent has (1) "Senior CSA status"; (2) a "knowledge of" TROUBLE SHOOTING, a skill set in company SERVICES, and expertise in PROVISIONING; and (3) had five of six responses published to the KB 252 creating a response "success rate" of 83% (⅚=0.83). This data will be used in a later step to calculate the agent's "credibility factor". The (2) item concerning the agent's experience will be compared to the categorization(s) of the response. In this case, the response has been categorized as a "service" response and the agent has a corresponding "skill set" status in that category. This status will be rated and given a weight in the overall "credibility factor" calculation and used to compare to any related administrative rules.

The IKBCC 250 queries the Administrative Rules Database 260 and returns the following rules. If the KB 252 does not contain any entry that match 100% of the parses, then produce Metadata and publish the response in the KB 252. If the response does not have a corresponding KB entry and the agent's "credibility factor" is greater than a 7 on a scale of 10, produce Metadata for this response and publish it to the KB 252. The IKBCC 250 analyzes and compares the administrative rules against the data it received back from the KB 252. This information satisfies the first administrative rule since there are no KB entries found that had Metadata with all of the parses for this particular response. The data returned must be further evaluated by using a formula to set the agent's "credibility factor". For this example, the "credibility factor" is based on a scale of one to ten, where ten has the highest credibility. It is calculated using the following formula:

For Agents in Training add 0 to CF (Credibility Factor)
  For Junior Agents add 1 to CF
  For Staff Agents add 2 to CF
  For Senior Agents add 3 to CF
For agent with "knowledge of" status which matches the response categorizations add 1 to CF
  For agent with "skill set" status one or more response categorization(s) add 2 to CF.
  For agent with "expertise" in one or more response categorization(s) add 3 to CF.
For agents with a "success rate" of 0% to 25% add 1 to CF
  For agents with a "success rate" of 26% to 50% add 2 to CF
  For agents with a "success rate" of 51% to 75% add 3 to CF
  For agents with a "success rate" of 76% to 100% add 4 to CF These measurements are added up, i.e., the current agent receives three points for being a senior agent, two points for a skill set in SERVICE which is one of the response categorizations, and four points for having a success rate of more than 76% totaling a "credibility factor" of nine. Therefore the second administrative rule is satisfied by the agent having a "credibility factor" of seven or more.

The IKBCC 250 determines the agent response meets both administrative rules criteria for producing and logging Metadata and publishing the response to the KB 252. The IKBCC 250 carries out the above process by creating the Metadata entry for the response from the parses and categorizations already performed and inserts this information into the KB 252 as well as publishes the response itself. And finally, the IKBCC 250 also updates the Agent Information Database 270 with data that the current agent has published a response in the specified categorizations.

It should now be apparent that a method has been described in which knowledge base can be automatically updated with Metadata using agent responses.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-implemented method of automatically adding data to a database using human agent responses to questions, comprising:
    receiving a question and routing the question to a human agent;
    using a response from said human agent to said question, determining whether to add the response to the database;
    if said determining step is positive then creating metadata for categorizing and describing said response, and updating the database with the response and said metadata; and
    if said determining step is negative then rejecting the response.

2. The method of claim 1, comprising parsing the response using at least one of keywords, key phrases, response categorizations, and natural language interpretation.

3. The method of claim 1, comprising comparing the response against previous agent responses to determine if the agent's response is unique.

4. The method of claim 3, comprising parsing the response using at least one of keywords, key phrases, response categorizations, and natural language interpretation.

5. The method of claim 4, comprising comparing the results of the parsing of the agent's response against previous results of the parsing the agent's response.

6. The method of claim 5, comprising determining the percentage of exact corresponding and partially corresponding metadata and/or database entries.

7. The method of claim 1, comprising evaluating a credibility factor of the human agent providing the response.

8. The method of claim 7, wherein the credibility factor includes at least one of determining the agent's area of expertise and determining the agent's status.

9. The method of claim 1, comprising determining the frequency with which the agent's previous responses have been stored in a knowledge base.

10. The method of claim 9, comprising assigning a period of time during which the frequency is determined.

11. The method of claim 1, comprising determining the frequency of recurring questions to the agent providing the response.

12. The method of claim 1, comprising determining the percentage of times percentage of times questions required escalation or reassignment from the current agent.

13. The method of claim 1, further comprising updating an entry associated with the human agent in an agent information database.

14. The method of claim 13, further comprising using the updated entry to determine credibility of the agent's subsequent response to a subsequent question.

15. The method of claim 14, further comprising determining, based on the credibility of the agent's subsequent response, whether to add the agent's subsequent response to said database.

16. The method of claim 13, wherein said updating of the agent information database is performed regardless of whether said determining step is positive or negative.

17. The method of claim 13, wherein a credibility score of the agent stored in the agent information database is increased if said determining step is positive, and decreased if said determining step is negative.

18. The method of claim 1, further comprising using the database as a knowledge base for customer self-service purposes.

19. The method of claim 1, wherein said determining step is positive if the response does not have a corresponding entry in said database, and a credibility score of the agent satisfies a predetermined criterion.

20. The method of claim 1, wherein the response is quality checked and if passed is returned to a customer originating the question regardless of whether said determining step is positive or negative.

21. A computer system, comprising:

a processor; and a memory coupled to said processor, the memory having stored therein sequences of instructions, which, when executed by said processor, causes said processor, after receiving a response to a question from a human agent, to perform the steps of:

using the human agent's response, determining whether to add the response to the database;

if said determining step is positive then creating metadata for categorizing and describing said response, and updating the database with the response and said metadata; and if said determining step is negative then rejecting the response.

22. A computer architecture, comprising:

receiving means for receiving a question and routing the question to a human agent;

determining means for;

receiving a response from said human agent to said question and determining whether to add the response to the database;

if said determining step is positive then creating metadata for categorizing and describing said response, and updating the database with the response and said metadata; and if said determining step is negative then rejecting the response.

23. An article including a computer readable medium having stored thereon sequences of instructions, said plurality of sequences of instructions including sequences of instructions which, when executed by a processor cause said processor to perform the steps of:

receiving a question and routing the question to a human agent;

using a response from said human agent to said question, determining whether to add the response to the database;

if said determining step is positive then creating metadata for categorizing and describing said response, and updating the database with the response and said metadata; and if said determining step is negative then rejecting the response.

* * * * *